Sept. 25, 1923.  1,468,986
B. WILTHIL
SAW SETTING AND SHARPENING MACHINE
Filed Aug. 30, 1921   5 Sheets-Sheet 4
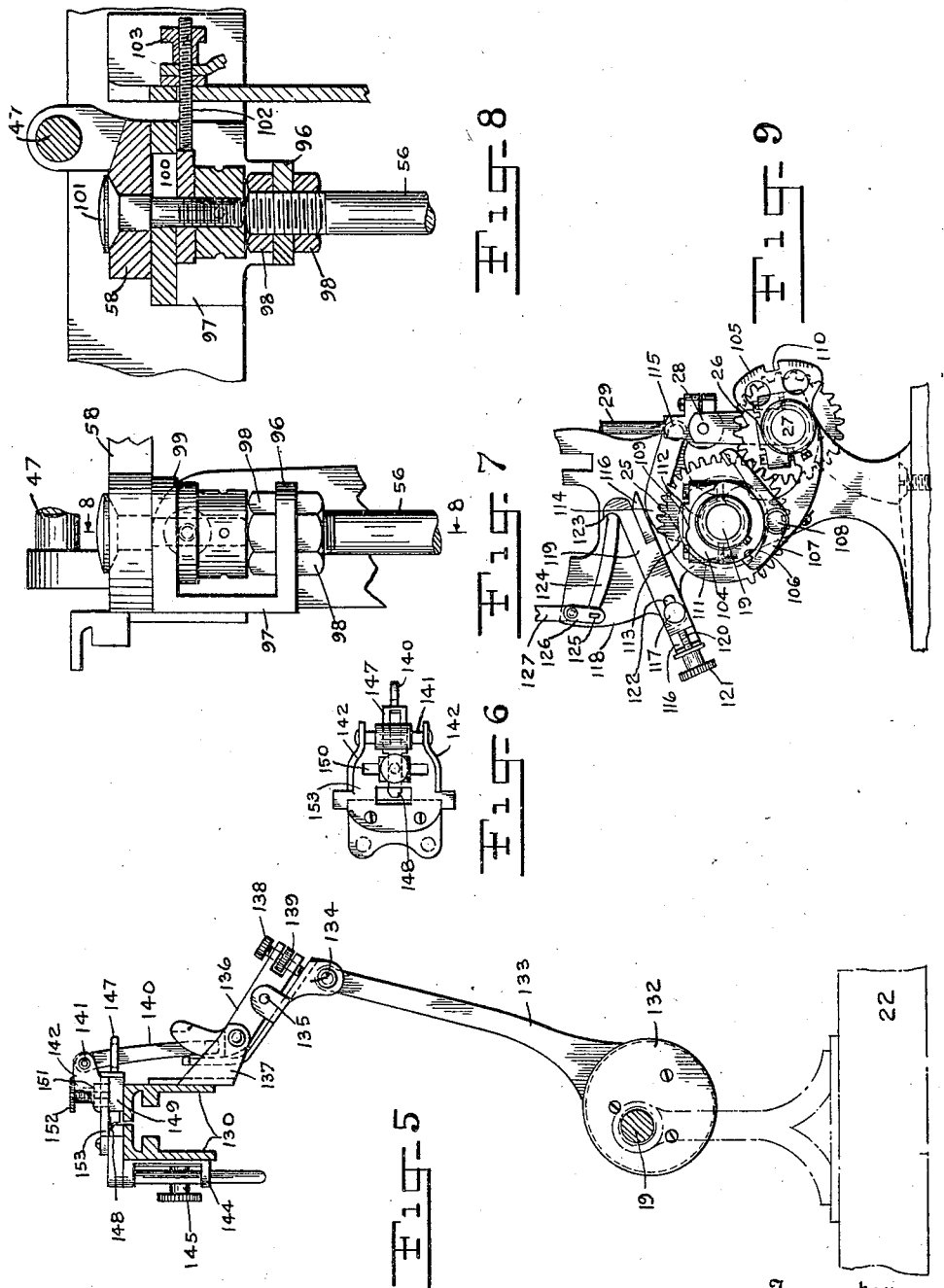
Inventor
Bernhard Wilthil.
By his Attorney
Thomas A. Hill

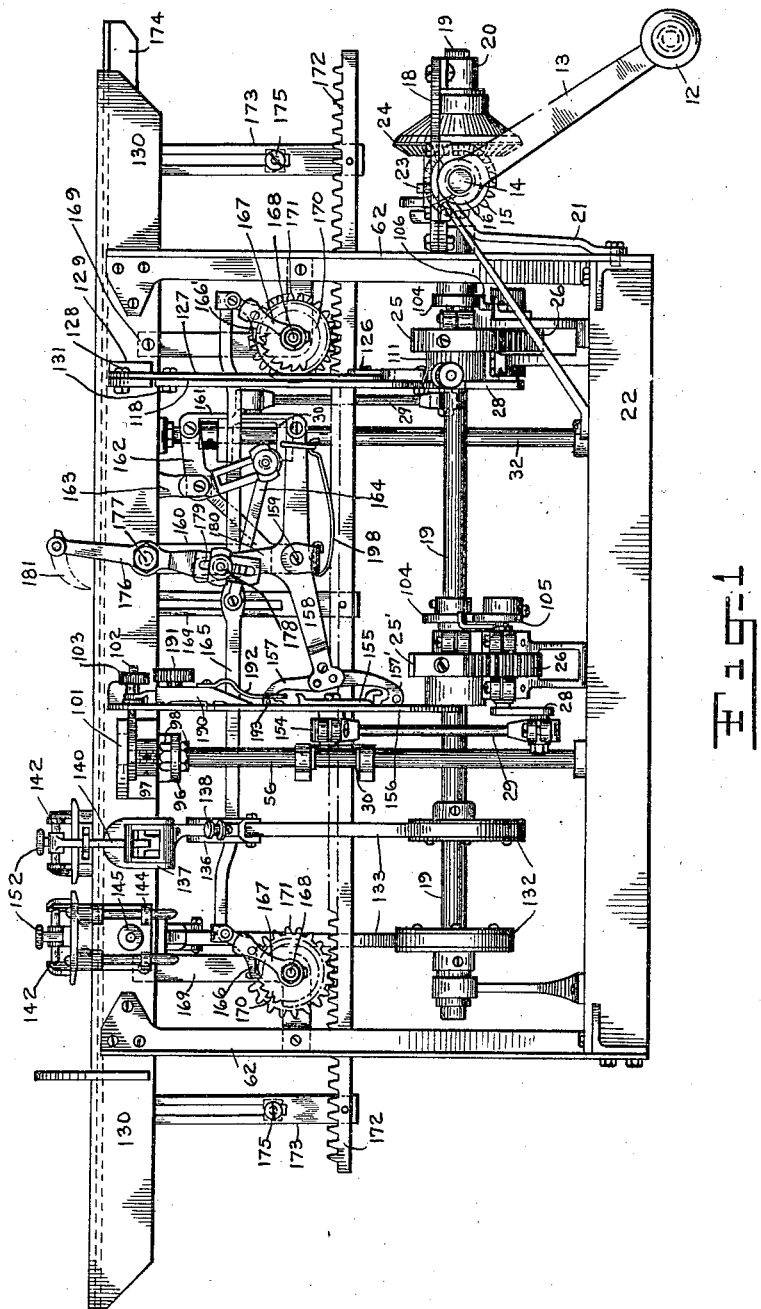

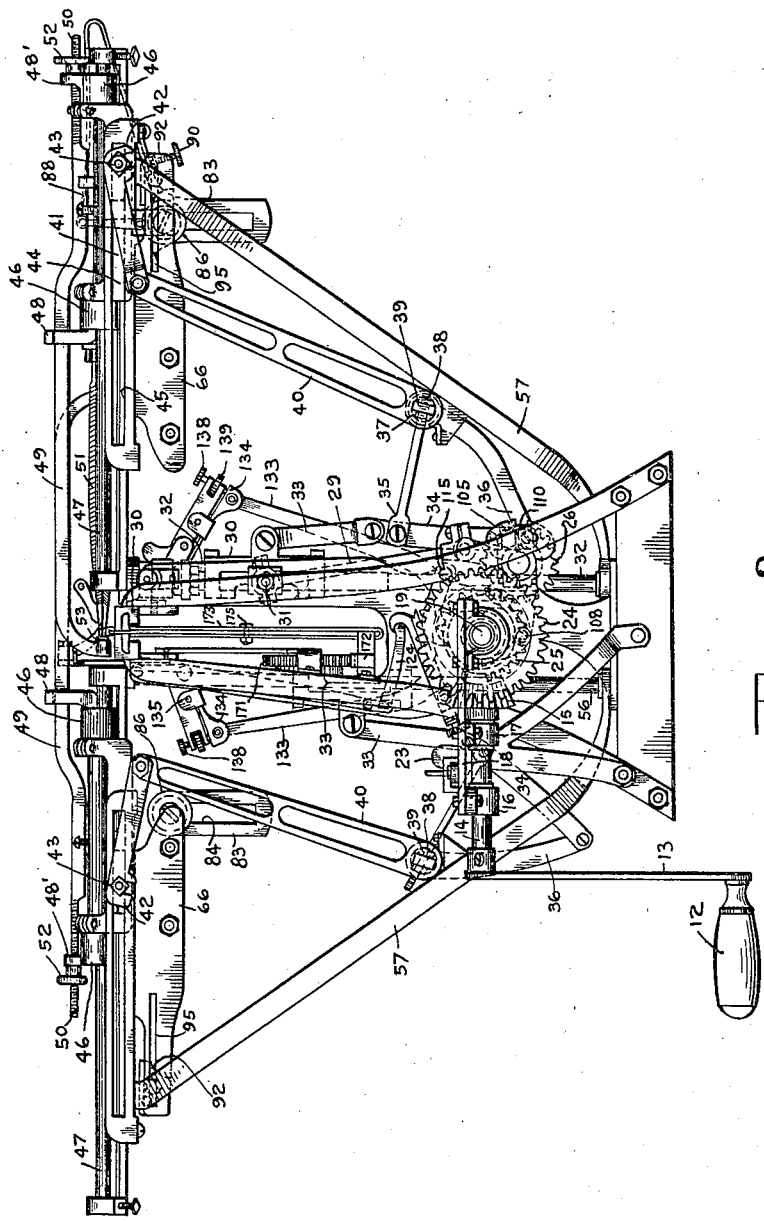

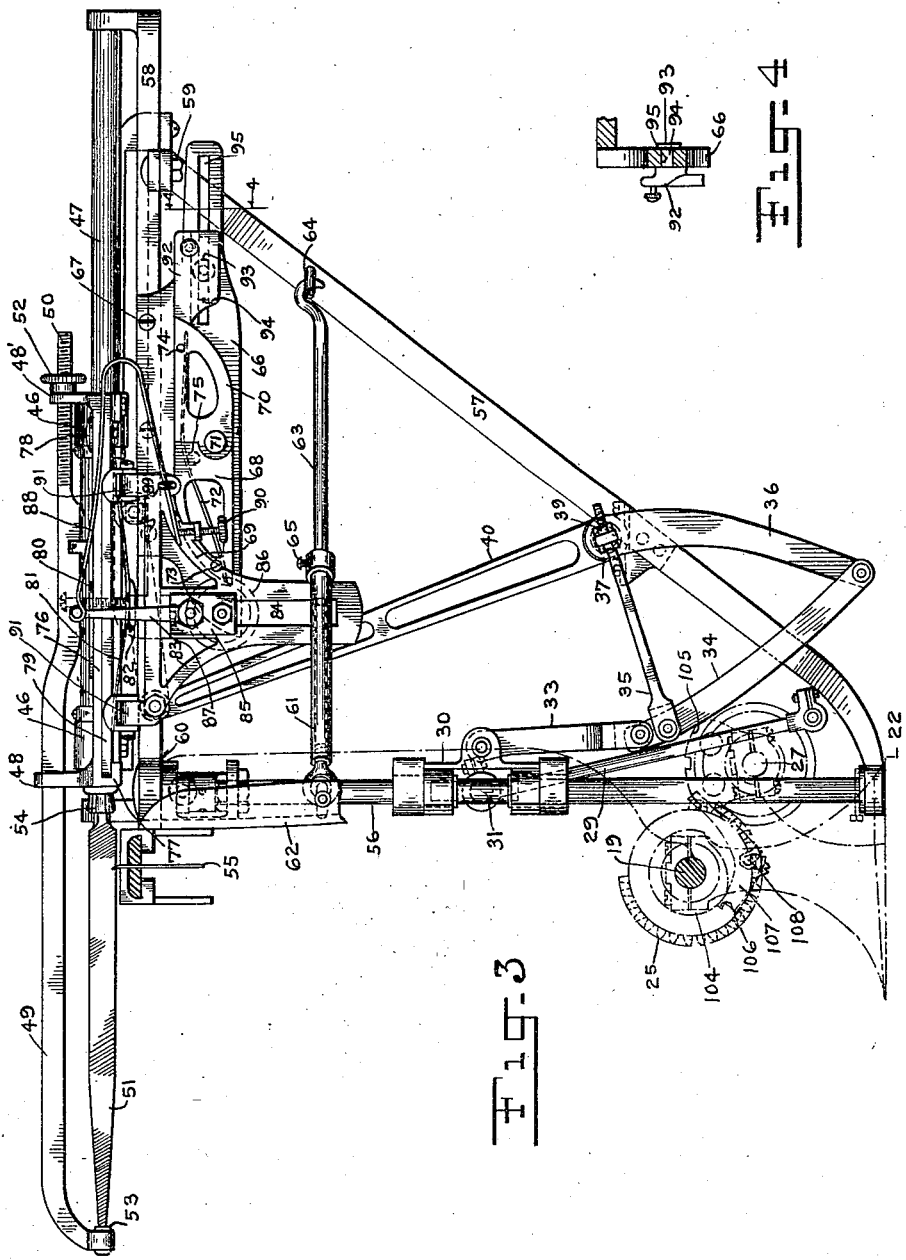

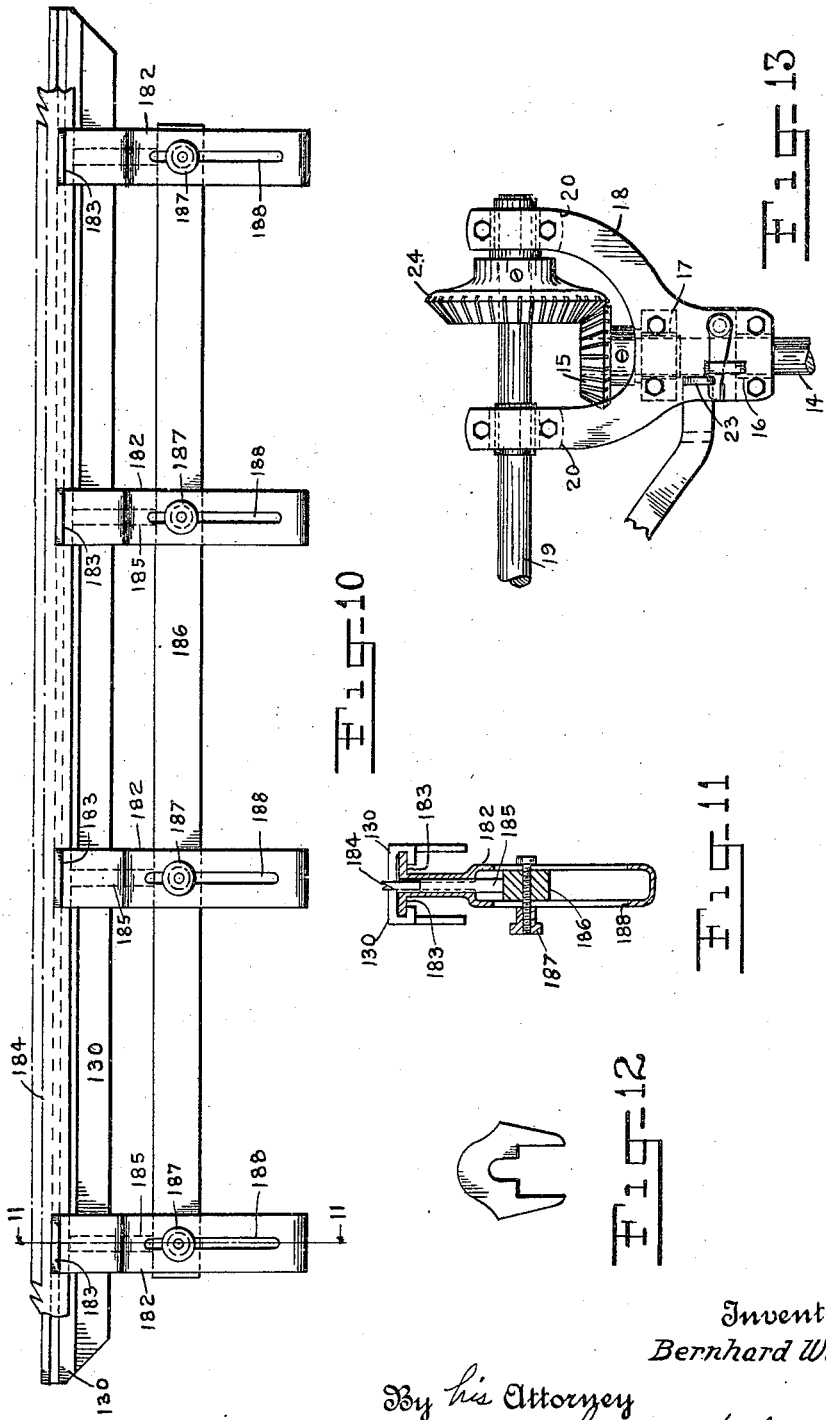

Patented Sept. 25, 1923.

1,468,986

UNITED STATES PATENT OFFICE.

BERNHARD WILTHIL, OF FLUSHING, NEW YORK.

SAW SETTING AND SHARPENING MACHINE.

Application filed August 30, 1921. Serial No. 496,886.

*To all whom it may concern:*

Be it known that I, BERNHARD WILTHIL, a citizen of the United States, residing at Flushing, L. I., in the county of Queens and State of New York, have invented certain new and useful Improvements in Saw Setting and Sharpening Machines, of which the following is a specification, reference being had therein to the accompanying drawing.

My invention relates to improvements in tooth setting and sharpening machines for saws, and more particularly has reference to a machine adapted to set or sharpen the teeth of a hand saw or band saw, or both, and includes certain automatic feed and adjustment and other mechanisms hereinafter more fully set forth.

Referring to the accompanying drawings, I have illustrated in Fig. 1 in front elevation, parts of the file carrying arms being eliminated, a suitable form of machine embodying an application of my invention. Fig. 2 is a view looking from right to left at Fig. 1 with the file carrying mechanism in position at either side of the machine. Fig. 3 is an enlarged detail looking from left to right at Fig. 1 illustrating one of the file carrying mechanisms, and Fig. 4 is a detail on the line 4—4 of Fig. 3, illustrating the application of an attachment for keeping the file out of contact with the saw when desired. Fig. 5 is an enlarged detail of the tooth setting mechanism, and Fig. 6 a plan view looking down upon the upper part of the same. Fig. 7 is an enlarged detail of the vertical bearing for the file carrying mechanism and Fig. 8 is a section on the line 8—8 of Fig. 7. Fig. 9 is an enlarged detail of the jaw clamping mechanism for rotating the saw while being set or sharpened. Fig. 10 is an enlarged detail of the saw blade clamp jaws more particularly adapted for band saws, and Fig. 11 is a cross-sectional detail on the line 11—11 of Fig. 10. Fig. 12 is a plan view of a reinforcing or locking member for the jaws, and Fig. 13 is a plan view looking down upon the hand driving mechanism.

Referring now more particularly to Fig. 1, 12 indicates a suitable handle mounted upon a crank 13 upon the shaft 14 carrying the beveled pinion 15 and of course it will be readily understood that in lieu of the handle and crank 12—13, a suitable drive pulley may be mounted upon the shaft 14. Referring now more particularly to Figs. 1 and 2, the shaft 14 it will be observed is carried in the bearings 16—17 secured upon the frame 18, which in turn pivots upon the shaft 19 by bearing such as 20 as shown. 21 indicates a bracket secured upon the base 22 of the machine, the upper end of which serves as a support for the frame 18 which may revolve about the shaft 19 and which may be provided with any suitable locking means such as 23 so as to allow the handle mechanism to be thrown up out of position for compactness in carrying.

The beveled pinion 15 upon the shaft 14 meshes with the beveled pinion 24 which is secured upon the shaft 19, and also secured upon the shaft 19 is a segmental pinion 25 for operating the file cutting mechanism, said pinion 25 being duplicated at 25′ for another file cutting mechanism which is substantially a reproduction of the said first file cutting mechanism, so that for the purpose of this specification only one of said file cutting mechanisms need be described, it being understood by reference to Figs. 2 and 3, that there are two such mechanisms, one at each side of the machine, and so adjusted that when one file is cutting the other is lifted and returned to the starting point so that it cuts while the first file is lifted and returns to its starting point, a matter merely of relative adjustment of the said file cutting mechanisms.

Referring now more particularly to said segmental driving pinion 25, upon the shaft 19, it will be observed by reference to Figs. 2 and 9, that it meshes with another smaller pinion 26 upon the shaft 27, said shaft 27 carrying a crank 28 to which is pivotally connected the connecting rod 29, at the upper end of which is provided a bearing 30 pivotally secured at 31 and adapted to slide vertically upon the rod 32, said bearing 30 being provided with a lever 33 pivotally connected thereto, at the lower end of which is pivotally connected the lever 34, at the upper end of which is pivotally connected the lever 35 and at the lower end of which is pivotally connected the lever 36, said levers 35 and 36 being pivotally mounted upon the bearing 37, and said lever 35 being provided with a threaded end 38 by which its extension through the bearing 37 may be controlled by a nut such as 39. Upon the other end of the pivotal bearing 38 is provided the lever 40 which in turn is pivotally connected at the top to the lever 41, the inner end of which is provided with an open jaw 42 to engage the bolt 43 which said bolt is secured to the carriage 44 and projects through the slot 45 serving as a bearing or guide as the carriage 44 reciprocates parallel therewith.

Referring now more particularly to the other carriage shown in Fig. 3, which is a duplicate of the one described, it will be observed that the carriage 44 is provided with bearings 46 which encircle the rod or shaft 47, which serves as a guide therefor, these bearings 46 are connected by a base member 76 having upwardly projecting lugs 48—48′, the former of which allow for the passage of the file holder 49, and the latter of which is tapped to receive the threaded end 50 of said file holder so that after the file 51 has been inserted, by turning up on the nut 52, the same is retained between the end 53 thereof and the socket 54 in the end of the frame 47 holding the file in position to be drawn back and forth across the saw blade 55.

56 indicates a vertical shaft secured in the base 22 of the frame, and provides bearing for the arm 57, the outer end of which is secured to the arm 58 at 59 as shown, the upper end of said frame 58 being pivotally mounted at the top of the rod 56 at 60 as shown, and 61 indicates a sleeve which may be secured upon the side frame or bracket 62 of the machine having a telescopical rod 63 with a hook at the end to engage said bracket 57 at 64 as shown, so as to retain the file mechanism at the desired angle to the saw blade, namely, at right angles, or any modification thereof as may be determined by the adjustment of the telescopical rod 63 within the sleeve 61 and accordingly as the same may be set by the screw 65. From the arm 58 depends the bracket 66 which may be secured thereto by screws such as 67 and upon said bracket 66 is secured another bracket 68 in the form of a cam having a curved surface 69 hereinafter more fully referred to, and having a pivoted portion 70 adapted to drop down upon the pivot 71 when the tension of the spring 72 retained beneath the pin 73 and beneath the pin 74 is overcome, said spring 72 passing over the stud 75. The sleeves or bearings 46 adapted to rotate upon the rod 47 carry the bar 76 previously referred to, and may be formed integrally therewith as shown, said bar 76 having a housing 77 at one end, and a pin 78 at the other end for rotating the bar 79, a suitable spring 80 being inserted between the bars 76 and 79 to impart resiliency to the relative movement thereof, thereby slightly cushioning the action of the file upon the saw teeth. Another spring 81 is secured beneath the bar 79 and is provided with a bearing surface 82 adapted to ride upon the arm 58, and from the outer side of the bar 79 is hinged at 91, the bracket 83, said bracket being provided with a guideway 84 within which the traveling member 85 rides vertically carrying a wheel 86 at the opposite side, which said wheel as the bracket 83 moves rightwardly looking at Fig. 3, rides upwardly upon the cam surface 69 until it reaches the pivoted member 70 which thereupon depresses against the action of the spring 72 allowing the wheel 86 to slip over the end of the same, thus dropping the file upon the saw blade, said wheel returning beneath the curved cam surface 70 and through the medium of the pivotal rod 87 and the tension of the spring 88, the other end of which is secured at 89 and may be adjusted by the screw 90, presses the file upon the blade of the saw until the wheel 86 passes beyond the leftward end of the cam 69 when it is lifted by the spring 88 and upon its return rightwardly looking at Fig. 3, lifts the bracket 83 and the carriage 76—79 through the medium of the hinges 91. 92 indicates an auxiliary bracket which may be secured at 93 by a screw or other suitable means, and which may be provided with a projecting portion 94 for engaging the slot 95, the details of the same being shown in Fig. 4. This bracket 92 serves as an extension for the pivoted cam member 70 so that by throwing it into the position shown in Fig. 3, the wheel 86 will continue to reciprocate over the top of the curved members 68—70 instead of passing beneath the same, thereby lifting the file out of action from the saw blade when so desired.

Referring now more particularly to Figs. 7 and 8, it will be observed that the vertical rod 56 passes upwardly through the lower flange 96 of the bracket 97 where it is secured by suitable nuts such as 98. The arm 58 is secured to the upper lug 99ᵃ of said bracket 97 through an elongated slot 100 by the screw 101, and said screw 101 may be shifted in said slot 100 by a screw such as 102 provided with lock nuts 103, thereby facilitating a movement of the arm 58 along a line parallel with the saw blade, thus insuring the accurate positioning of the file with reference to the teeth to be cut, the angle at which said teeth are to be cut being determined by the projection of the bracket 61—62 as aforesaid.

Returning now to the drive from the segmental pinion 25 to the pinion 26, it will be observed by reference to Fig. 9, that upon the shaft 19 carrying said segmental pinion 25 is also mounted the cam 104. Adjacent the cam 104 and in alignment therewith, is the cam 105 upon the shaft 27 so that as the last tooth of the segmental pinion 25 rotating rightwardly leaves the pinion 26 rotating leftwardly looking at Fig. 9, the end 106 of the rocking member 107 pivoted at 108, drops down into the recess 109 of said cam 104, thereby throwing the end 109 of said rocking member 107 into the notch 110 of said cam 105 stopping the further rotation of the pinion 26 until the end 106 is again lifted by the cam 104, thereby disengaging and lifting clear the end 109 of the rocker 107 from the notch 110 of the cam 105, allowing the pinion 26 to again rotate. This makes the movement of the pinion 26 not only intermittent, but positive and prevents any loss of motion, as the result of which we have the intermittent vertical reciprocation of the carriage 30 which is translated into an intermittent horizontal reciprocation of the file, so that as one file cuts, the other is elevated returning to its starting point and is stopped for a short space of time clear of the saw blade, thus allowing the movement of the saw blade, while out of contact with both of the files and providing for the cutting strokes successively, first by one file and then the other, thus minimizing the driving or power effort on the machine.

Upon the shank 111 of the segmental pinion 25 a portion 112, shown to better advantage in Fig. 9, is cut away allowing for the passage of the end 113 of the pawl 114 therein, said pawl being pivotally mounted at 115 as shown. The shoulder of this pawl it will be observed engages the member 116 which is pivotally mounted at 117 upon the U-frame 118, hereinafter more fully referred to, and substantially parallel therewith is another member 119 provided at the inner end with a threaded shank 120 and a nut 121 bearing against the inner end of the member 116, the member 119 having a slot 122, so that by turning down upon the nut 121, the member 119 may be drawn leftwardly, the inner end terminating in the hook 123 engaging the lever 124 pivoted at 125 to the link 126, the other end of said link being pivoted to the rod 127, the upper end of which it will be observed by reference to Fig. 1, is bolted to the fork 118 and the extreme end of which a little further up is bolted at 128 to the bracket 129 upon the jaw 130, from which it will be seen that 128 being a fixed point upon the jaw 130 and the bolt or screw 131 being at the upper extremity of the fork 118, the lower end of the lever 127 can only be moved right or left looking at Fig. 9 by swinging said fork, the resiliency thus imparted being transmitted through the lever 124 to the lever 119 and 116 upon the nose of the pawl 114 which rides upon the cam shank 111 and slips into the recess thereof under the influence of said resiliency upon each revolution of the shaft 19. This causes the open ends of the fork 118 to which are secured the jaws 130 to compress together during each revolution of the shaft 19 except during the period when the pawl 114 is in the recess of the shank cam 111, and this is so timed that the jaws 130 are together and grip the saw blade during the cutting movement of each of the files, releasing the saw blade in order that the same may be shifted two teeth during each revolution and while the files are lifted therefrom.

Referring now more particularly to Figs. 1, 5 and 6, it will be observed that at the left side of the machine, assuming that the saw blade travels rightwardly looking at Fig. 1, are two tooth setting members operative from the shaft 19 by the eccentrics 132. These tooth setting mechanisms being the same, it will be necessary to describe only one of them, it being understood that they work oppositely, that is to say, one sets a tooth in the direction opposite to the other. Referring to one of said apparatus, it will be observed that the lever 133 connected at its upper extremity to the pivotal bearing 134 which is in turn pivotally mounted at 135 to the lever 136, which in turn is pivotally mounted to the bracket 137, secured to the jaw 130, the outer end of the lever 136 being provided with an adjustment screw 138 and lock nut 139 for adjusting it relative to the member. The inner end of the member 134 and the inner end of the member 136 engage therebetween the lever 140 which is pivoted at 141 to the member 142, seated in brackets 144 in the opposite jaw 130, said bracket 144 being retained to said jaw by any suitable means such as the thumb nut 145. The pin 141 between the brackets 142 is sufficiently long to allow for the shifting of the member 140, and the member 140 carries with it when so shifted the plunger 147 through which it projects, the inner end of said plunger being shaped substantially as shown at 148 for setting the tooth against which it projects. The plunger 147 passes through a block or housing 149 which is adapted to shift along the slot 150 when the tongue 140 is shifted, and this block has an upwardly projected threaded member which passes through the cap 151 and is provided with a nut 152, so that when the nut 152 is turned down upon the cap 151, said cap bears upon the plate 153 from which the brackets 142 project, thereby binding the housing member 149 in a predetermined position so that the plunger 147—148 strikes the desired tooth for setting the same, thus facilitating a very accurate adjustment of the tooth setting mechanism.

Referring now again to Fig. 1, it will be observed that from the crank bearing 154 there is provided a traveling member 155 adapted to slide vertically within the forked guide 156 and is adapted to engage at each end of its stroke the members 157—157' pivotally secured upon the end of the member 158 pivoted at 159 to the bracket 160 secured to the jaw 130. The other end of the bracket 158 is pivotally connected to the lever 161, the opposite end of which is pivotally connected to the bell crank 162 pivoted in the bracket 163, the opposite end of which is pivotally connected to the lever 164 which in turn is pivotally connected to the rod 165 the opposite ends of which are connected to the pawls 166—166'. Each of the last-mentioned pawls are pivotally mounted in levers such as 167 which in turn are pivotally mounted upon shafts 168 in the ends of the brackets 169 so that as the lever 165 throws rightwardly looking at Fig. 1, the pawls 166—166' ride over the ratchet wheels 170 and as the thrust of the connecting rod 165 reverses and moves leftwardly, the pawls engaging the ratchet wheels 170 rotate them anti-clockwise, carrying therewith the pinions 171 which meshing with the rack 172, cause the same to periodically move rightwardly step by step looking at Fig. 1, and said rack 172 carrying standards 173 at the top of which is secured the jaws 174 between which the saw blade may be retained, so that it will be observed that by raising or lowering the bolts 175, the projection of the saw blade above the jaws 130—174 may be predetermined as required, it being understood that the jaws 174 are merely carrying jaws, while the jaws 130 close and open periodically for controlling the movement of the blade relative to the files and setting tools as hereinbefore described. 190 indicates a vertically adjustable member retained in position by the thumb nut 191 said member being provided with the guide plate 192 beneath which the pin 193 of the arm 157 projects, and 198 indicates a spring secured at one end to the bearing 159 and at the other end to the other extremity of the arm 158 as shown, so that by raising or lowering the member 190, the vertical reciprocation of the member 157 may be controlled, thereby controlling the distance the rack 172 moves each time, in other words, the adjustment of the member 190 controls the movement of the rod 165 and the consequent rotation of the pinions 171, thereby enabling the movement of the saw blade a lesser or greater extent according to the fineness or coarseness of the teeth thereof.

As a further means for feeding a saw blade, such as a band saw, another bracket 176 may be provided, pivotally mounted at 177 upon the jaw 130, the lower end being provided with a screw 178 to engage the slot 179 in the arm 180 pivoted at 159 as aforesaid, the outer end of the lever 176 being provided with a pawl 181 for engaging the teeth of the band saw and shifting it leftwardly, looking at Fig. 1 such predetermined distance as may be found desired for the operation of the files or setting tools. Where the machine is to be used for band saw work, instead of using the rack and jaws 172—174, the same may be withdrawn and the traveling member shown at 182 in Figs. 10 and 11, may be employed. This traveling member it will be observed is provided with laterally projecting flanges 183 at the top which engage the jaws 130 and between which the band saw 184 may be secured upon the top of plungers such as 185 projecting from the filler rod 186 which in turn may be raised and lowered by the adjusting screw and nut 187 within the slots 188 thus projecting the band saw blade the required predetermined extent.

The blanked-out member shown to advantage in plan view in Fig. 12 is in the nature of a lock or retaining member for holding the jaws 130 and reinforcing the same while the setting is being done, and as will be observed may be readily slipped on and off the jaws without any extra fastening means.

Of course it will be understood that various modifications may be made in the construction and arrangement of parts without departing from the spirit of the invention as claimed.

I claim:

1. In a machine of the class described, a pair of jaws longitudinally of the upper part thereof and movable uprights for supporting said jaws, a drive shaft longitudinally of said machine beneath said jaws and file reciprocating transmission transversely thereof connected by rods and cams with said drive shaft, and a rack intermediate said jaws and said drive shaft, and pinions meshing therewith operatively connected with the transmission of said machine for controlling the feed thereof.

2. In a machine of the class described, means for holding and feeding a saw periodically, means for applying files to said saw while the same is held and for keeping the files away from said saw while the same is being moved, said machine having interchangeable cams adapted for varying the length of stroke of the files.

3. In a machine of the class described, means for holding and feeding a saw periodically, means for applying files to said saw while the same is held and for keeping the files away from said saw while the same is being moved, said machine having a pair of jaws for periodically holding said saw and a holder for said saw traveling through said jaws.

4. In a machine of the class described, means for holding and feeding a saw periodically, means for applying files to said saw while the same is held and for keeping the files away from said saw while the same is being moved, said machine having a pair of jaws for holding said saw periodically, and a holder for said saw traveling through said jaws, said holder having a rack parallel therewith and ratchet mechanism for moving said rack.

5. In a machine of the class described, means for holding and feeding a saw periodically, means for applying files to said saw while the same is held and for keeping the files away from said saw while the same is being moved, a crank shaft, and connecting rod for reciprocating said files, and an adjustable shaft for varying the stroke of said connecting rod for files of different lengths.

6. In a machine of the class described, means for holding and feeding a saw periodically, means for applying files to said saw while the same is held and for keeping the files away from said saw while the same is being moved, and a crank shaft and connecting rod for reciprocating said files, and a vertically reciprocating transmission between said crank shaft and the drive shaft of said machine.

7. In a machine of the class described, means for holding and feeding a saw periodically, means for applying files to said saw while the same is held and for keeping the files away from said saw while the same is being moved, said machine having a pair of jaws for holding said saw periodically, and a holder for said saw traveling through said jaws, a pair of tooth setters upon said jaws, cams upon the drive shaft, and connections therebetween for operating the same.

8. In a machine of the class described, a pair of jaws longitudinally of the upper part thereof and movable uprights for supporting said jaws, a drive shaft longitudinally of said machine beneath said jaws and file reciprocating transmission transversely thereof connected by rods and cams with said drive shaft, and a rack intermediate said jaws and said drive shaft, and pinions meshing therewith operatively connected with the transmission of said machine for controlling the feed thereof, and a holder for said saw carried by said rack and adapted to shift said saw through said jaws while said files are lifted clear of said saw.

9. In a machine of the class described, means for holding and feeding a saw periodically, means for applying files to said saw while the same is held and for keeping the files away from said saw while the same is being moved, said machine having a pair of jaws for holding said saw periodically, and a holder for said saw traveling through said jaws, a pair of tooth setters upon said jaws, cams upon the drive shaft, and connections therebetween for operating the same, said tooth setters operating simultaneously with the cutting of said files.

10. In a machine of the class described, means for holding and feeding a saw periodically, means for applying files to said saw while the same is held and for keeping the files away from said saw while the same is being moved, each of said files mounted upon cylindrical bearing, and a fixed rod upon which said bearing reciprocates and oscillates.

11. In a machine of the class described, means for holding and feeding a saw periodically, means for applying files to said saw while the same is held and for keeping the files away from said saw while the same is being moved, a cam and a wheeled carriage for the file holder adapted to travel over and under said cam.

12. In a machine of the class described, means for holding and feeding a saw periodically, means for applying files to said saw while the same is held and for keeping the files away from said saw while the same is being moved, said means for applying and removing each of said files including a cam adapted to rotate said file about a fixed bearing parallel to its line of feed during each reciprocation of the same.

13. In a machine of the class described, means for holding and feeding a saw periodically, means for applying files to said saw while the same is held and for keeping the files away from said saw while the same is being moved, said machine having a pair of jaws for holding said saw periodically, and a holder for said saw traveling through said jaws, and means for adjusting said jaws for holding saws of different thicknesses.

14. In a machine of the class described, means for holding and feeding a saw periodically, means for applying files to said saw while the same is held and for keeping the files away from said saw while the same is being moved, said machine having a pair of jaws for holding said saw periodically, and a holder for said saw traveling through said jaws, said holder having a rack parallel therewith and ratchet mechanism for moving said rack, said ratchet mechanism disengaged except when feeding said saw.

15. In a machine of the class described, means for holding and feeding a saw periodically, means for applying files to said saw while the same is held and for keeping the files away from said saw while the same is being moved, said machine having a pair of jaws for holding said saw periodically, and a holder for said saw traveling through said jaws, said holder having a rack parallel therewith and ratchet mechanism for moving said rack, said ratchet mechanism interchangeable for feeding saws having different sized teeth.

In testimony whereof I hereunto affix my signature.

BERNHARD WILTHIL.